(12) United States Patent
Isoda

(10) Patent No.: US 7,677,641 B1
(45) Date of Patent: Mar. 16, 2010

(54) CAMPER TRUCK TENT

(76) Inventor: Yukio Isoda, 3749 W. 176th St., Torrance, CA (US) 90504

( * ) Notice: Subject to any disclaimer, the term of this patent is extended or adjusted under 35 U.S.C. 154(b) by 20 days.

(21) Appl. No.: 11/977,393

(22) Filed: Oct. 24, 2007

Related U.S. Application Data

(60) Provisional application No. 60/854,926, filed on Oct. 27, 2006.

(51) Int. Cl.
*B60P 3/32* (2006.01)
(52) U.S. Cl. .............. 296/159; 296/160; 296/161; 296/164; 135/88.05; 135/88.13
(58) Field of Classification Search ........... 296/159, 296/160, 161, 164, 173, 26.04, 26.06, 26.07; 135/88.05, 88.13
See application file for complete search history.

(56) References Cited

U.S. PATENT DOCUMENTS

| | | | |
|---|---|---|---|
| 3,773,379 A | 11/1973 | Loiseau | |
| 4,310,194 A | 1/1982 | Biller | |
| 4,332,265 A | 6/1982 | Baker | |
| 5,238,288 A | 8/1993 | Chandler | |
| 5,261,436 A * | 11/1993 | Funk | 135/156 |
| 5,299,849 A * | 4/1994 | Cook et al. | 296/100.15 |
| 6,000,745 A | 12/1999 | Alexa | |
| 6,035,875 A * | 3/2000 | Chen | 135/88.07 |
| 6,283,536 B1 * | 9/2001 | Muzyka et al. | 296/165 |
| 6,371,144 B1 * | 4/2002 | Ragatz | 135/156 |
| 6,481,784 B2 | 11/2002 | Cargill | |
| D484,942 S | 1/2004 | Rapaport et al. | |
| 6,799,787 B2 | 10/2004 | Angelos | |
| 6,932,418 B1 | 8/2005 | Connell | |
| 7,021,694 B1 | 4/2006 | Roberts et al. | |
| 2002/0109374 A1 * | 8/2002 | Cargill | 296/159 |
| 2003/0146646 A1 | 8/2003 | Cervenka | |

* cited by examiner

*Primary Examiner*—Patricia L Engle
*Assistant Examiner*—Sunsurraye Westbrook
(74) *Attorney, Agent, or Firm*—Clement Cheng

(57) ABSTRACT

A Camper Truck Tent for detachably mounting on a pickup truck, consisting of front and rear mounting supports attached to the truck cargo box sidewalls, various tent poles attaching the folded out tent to the mounting supports, erecting means for folding out the tent and two beds placed inside the erected tent. When dismantled, all these components occupy minimum space. The tent itself is stored in a self-contained pouch on the cargo box floor, the mounting supports in an envelope integral with one bed and the tent poles in an envelope integral with the second bed. The stored components are close to the cargo box floor and out of sight of the truck driver. Several tent pole configurations are available: two main configurations and three alternative configurations. Front and aft erecting means keep the tent folded out. The front means is a front strap secured to the front of the truck or a cramping tent pole. The aft means are aft straps secured to the downed tailgate.

15 Claims, 10 Drawing Sheets

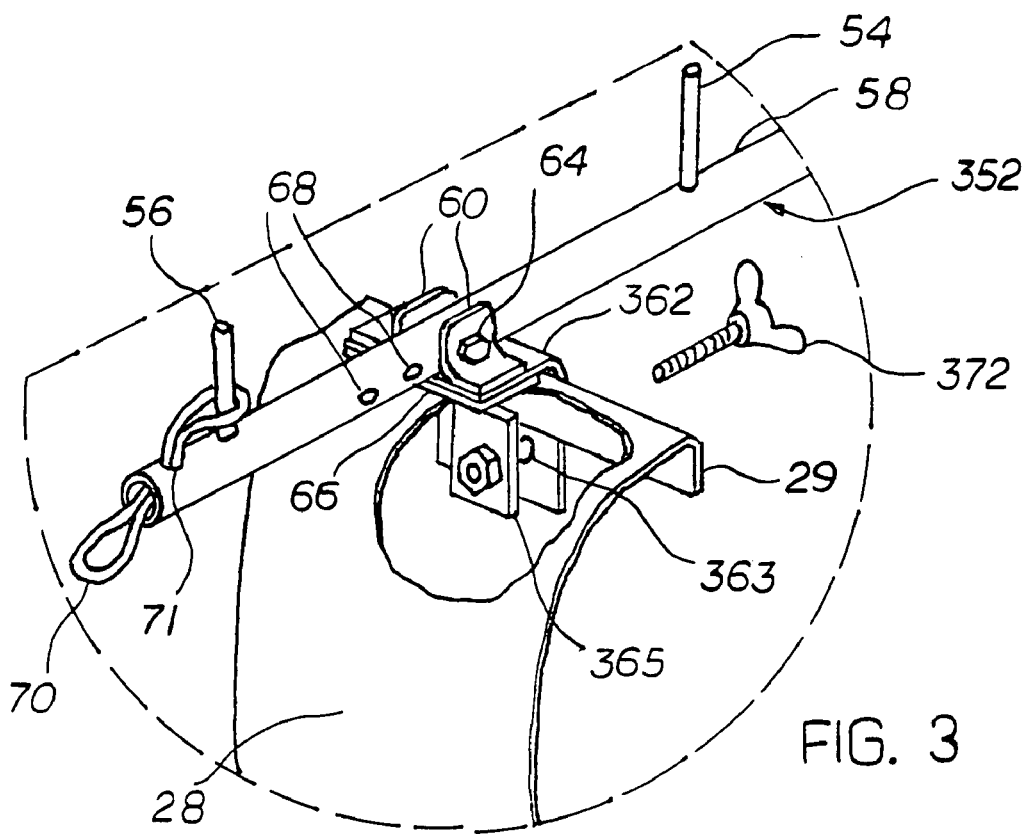
FIG. 3
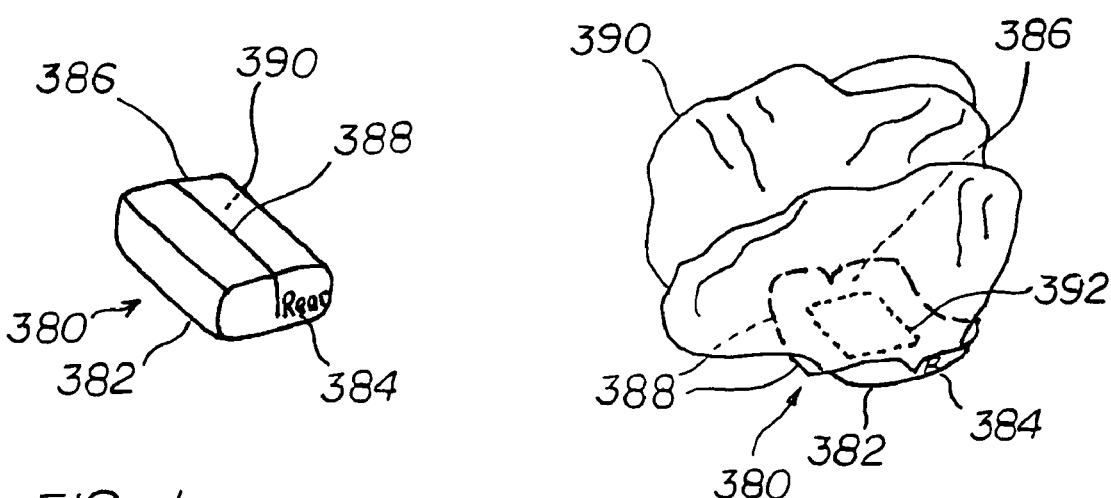
FIG. 4
FIG. 5

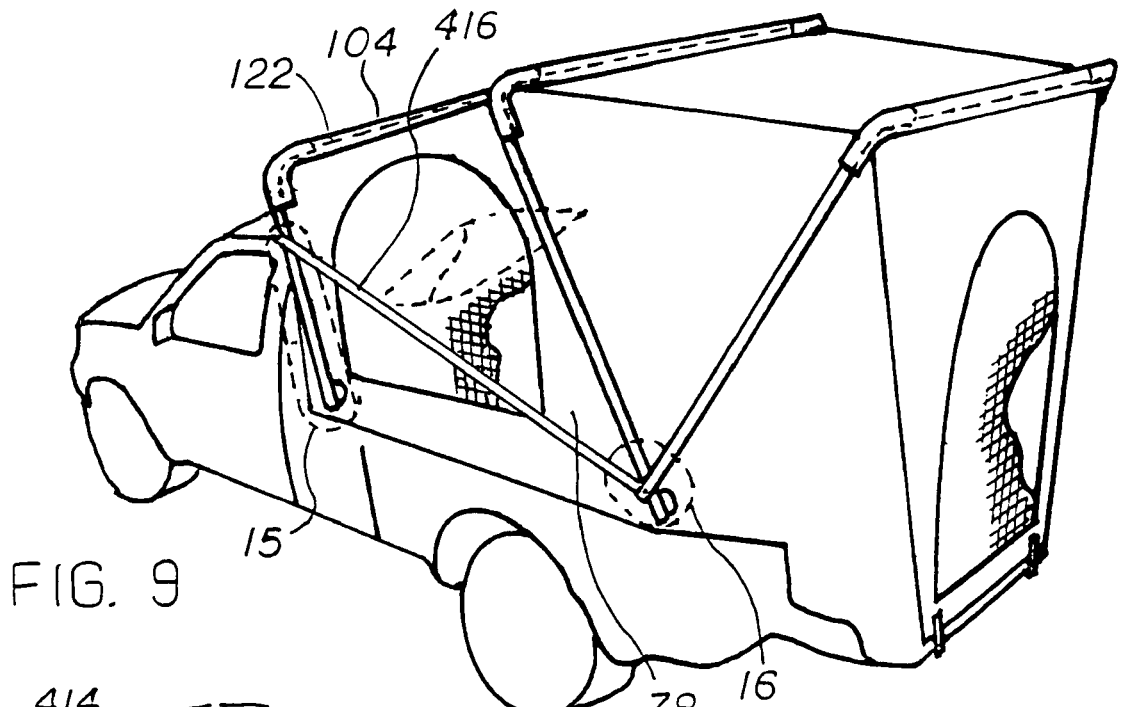
FIG. 9
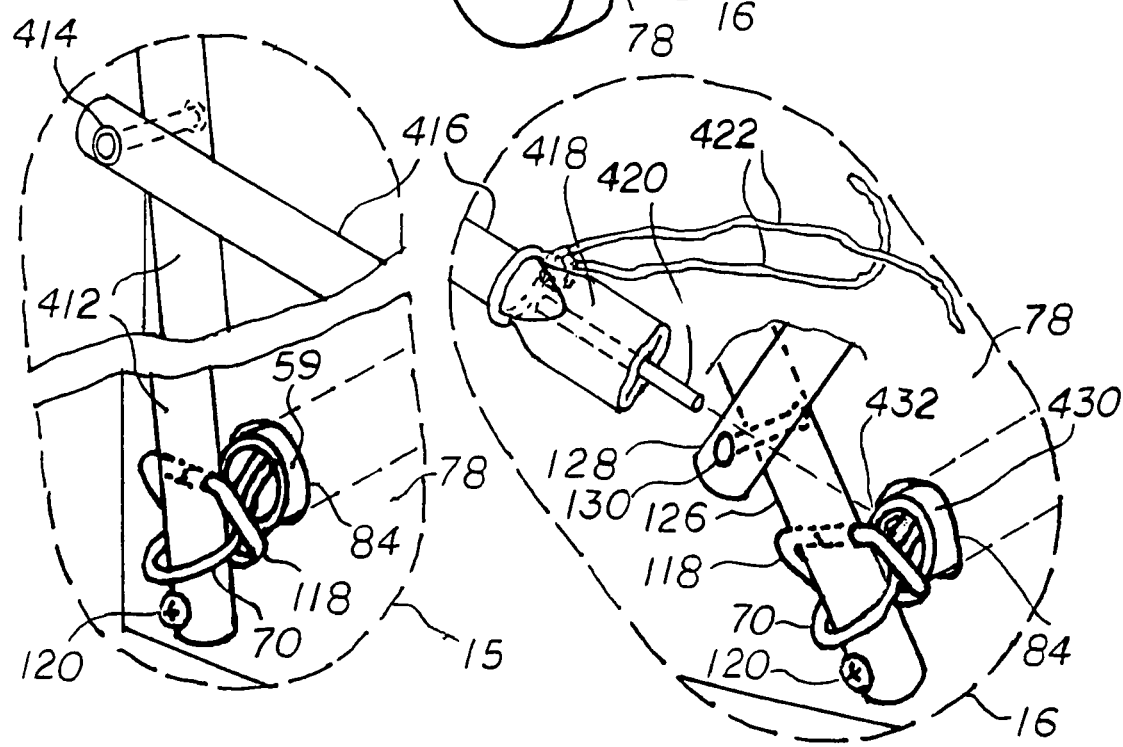
FIG. 10
FIG. 11

CAMPER TRUCK TENT

RELATED DOCUMENTS

Disclosure Documents deposited with USPTO as follows:
No. 604278 on 2 Aug. 2006
No. 604409 on 7 Aug. 2006
No. 605820 on 6 Sep. 2006

CROSS-REFERENCE TO RELATED APPLICATIONS

This application claims the benefit of Provisional Patent Application Ser. No. 60/854,926 filed 27 Oct. 2006.

FIELD OF INVENTION

This invention relates to structures which can be mounted on highway vehicles. In particular it relates to tent-type structures which can be detachably mounted on open trucks.

BACKGROUND OF THE INVENTION

A number of designs exist for tent structures which can be mounted on pickup trucks and related vehicles. A search was conducted in the U.S. patent literature which resulted in the following patents and patent publications:
U.S. Pat. No. 3,773,379 (Nov. 1973) to Loiseau
U.S. Pat. No. 4,310,194 (Jan. 1982) to Biller
U.S. Pat. No. 4,332,265 (Jun. 1982) to Baker
U.S. Pat. No. 5,238,288 (Aug. 1993) to Chandler
U.S. Pat. No. 6,000,745 (Dec. 1999) to Alexa
U.S. Pat. No. 6,481,784 (Nov. 2002) to Cargill
2003/0146646 (Aug. 2003) to Cervenka
D484,942 (Jan. 2004) to Rapaport et al
U.S. Pat. No. 6,799,787 (Oct. 2004) to Angelos
U.S. Pat. No. 6,932,418 (Aug. 2005) to Connell
U.S. Pat. No. 7,021,694 (Apr. 2006) to Roberts et al.

None of these patents provide the configurations, convenience and facility of erection and removal of the present invention as described in the Summary of the Invention and Detailed Description which follow.

SUMMARY OF THE INVENTION

The Camper. Truck Tent of this invention comprises two horizontal mounting support assemblies, a tent assembly, tent poles, and two beds. The mounting support assemblies are mounted in parallel across the tops of the left and right walls of the truck cargo box, near the front and near the rear, and fastened securely to the truck hooks. The mounting support assemblies contain studs to fasten the beds, and loops to hold the tent poles.

The tent assembly is initially in the collapsed state and placed over the mounting support assemblies such that holes in the tent floor are penetrated by the studs of the mounting support assemblies.

Three top poles are inserted into the sleeves located on the top front, center, and aft portions of the tent. The angled ends of the six side poles are fitted to the top poles in the left and right sleeves, while their other ends are attached to the loops at the tip of the mounting support assemblies, which form three rectangles (forward, center and aft) placed flat on top of the truck cargo box.

To fold out the tent, its front and aft straps are pulled. The front strap is hooked to the front of the truck, lifting the forward top pole and erecting the forward side poles in a pivoting motion around their loop attachment. The aft straps are pulled by tilting down the tailgate, causing the aft wall to lift the center and aft top poles. The length of the front strap is adjusted to maintain the top and aft tent walls properly stretched. Lastly, the two beds are brought in through the aft door and mounted on the studs of the mounting support assemblies.

Various user-friendly features are provided, such as: adjustable lateral position of mounting supports to fit variable width cargo boxes; permanent attachment of properly oriented tent pouch to tent floor for convenient correct tent storage and deployment; concave beds for greater stability; laterally extended attachment points in the mounting support assemblies for more tent space and volume; a tent collapsing system allowing a free rear view for the driver; and storing all the poles in one bed envelope, while the two mounting support assemblies are stored in the other bed envelope, which avoids additional storage bags.

BRIEF DESCRIPTION OF THE FIGURES

A better understanding of the Camper Truck Tent of the present invention may be gained by reference to the following Detailed Description of the Invention, in conjunction with Figures showing the details of the invention.

In the Figures,

FIG. 3 is a pictorial view of mounting attachment details, alternative to FIG. 2;

FIG. 4 is a pictorial view of a tent pouch assembly;

FIG. 5 is a pictorial view of a folded tent;

FIG. 9 is a pictorial view of a tent assembly mounted on a truck, with cramping side pole replacing front hook strap;

FIG. 10 is a pictorial view of connection details of cramping side pole, forward side pole and front support;

FIG. 11 is a pictorial view of connection details of cramping side pole, aft side pole assembly and rear support;

DETAILED DESCRIPTION OF THE INVENTION

Figure 6:
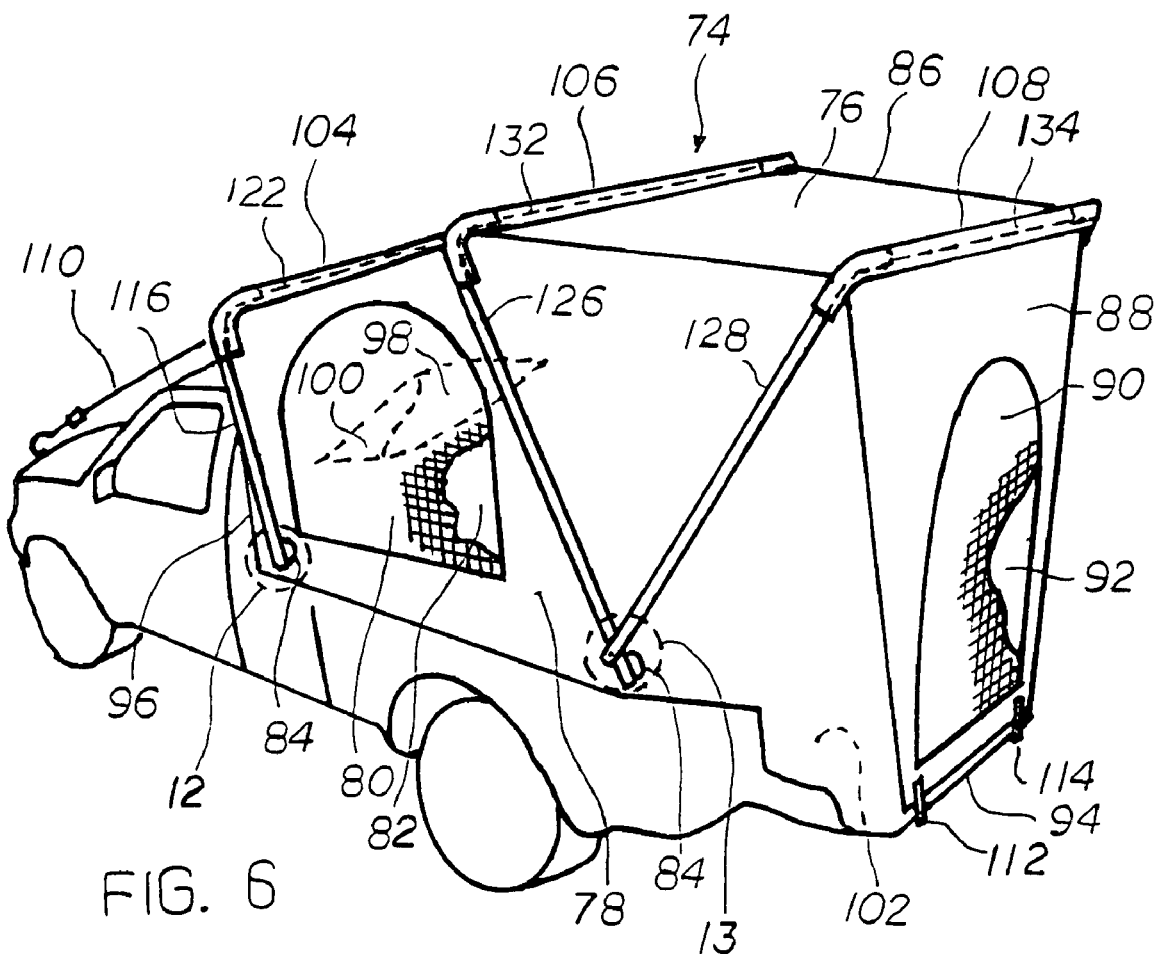
FIG. 6 is a pictorial view of a tent assembly mounted on a truck.

The Camper Truck Tent of this invention is shown in several configurations, apparent from the pictorial assembly drawings with the tent assembly fully folded out on a truck, as follows:

Main Configuration in two versions, FIG. 6 and FIG. 9;
Alternative No. 1, FIG. 19;
Alternative No. 2, FIG. 20, and
Alternative No. 3, FIG. 23.

Figure 1:
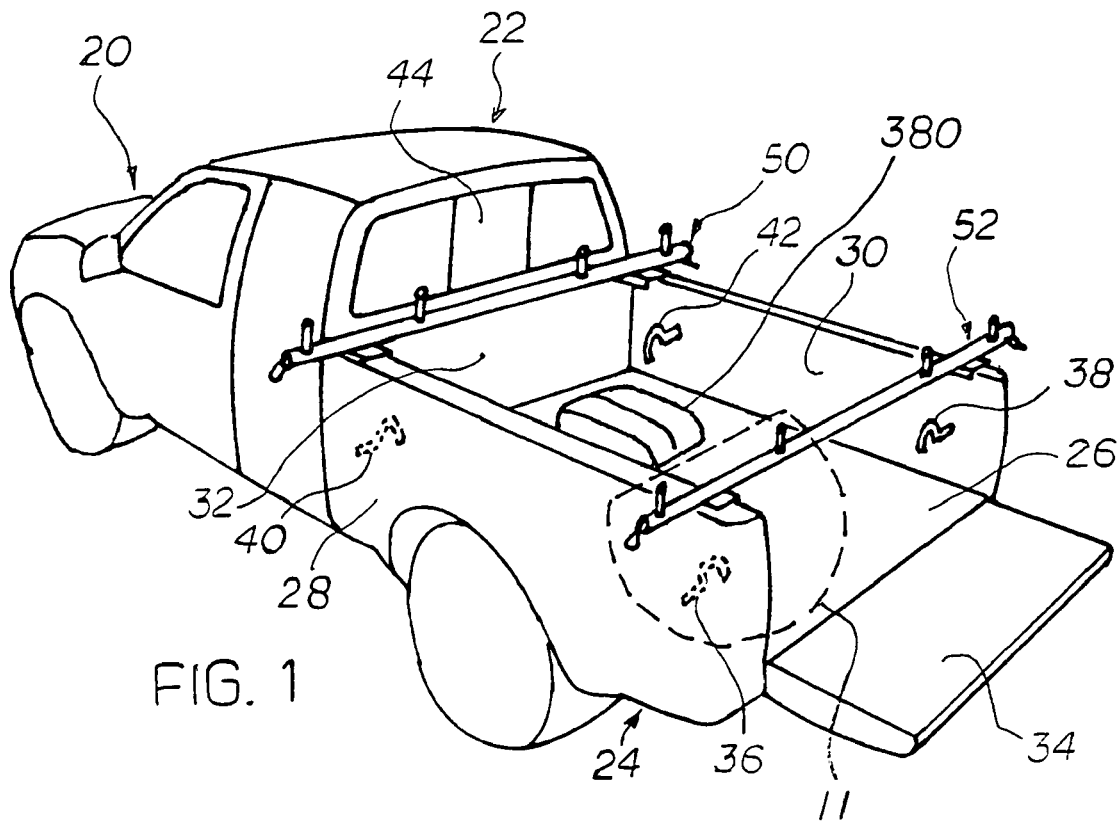
FIG. 1 is a pictorial view of front and rear mounting support assemblies mounted on a truck.

Referring now to FIG. 1, there is shown the lateral attachment of mounting support assemblies (50,52) to side walls (28,30) of truck cargo box 24 of pickup truck 20. Front assembly 50 is located close to cargo box forward wall 32 just below rear window 44 of truck cab 22. Rear assembly 52 is located just forward of tailgate 34. Cargo hooks 36 and 40 are attached to the interior of left sidewall 28, while cargo hooks 38 and 42 are attached to the interior of right sidewall 30. Cargo box floor 26 supports tent pouch assembly 380, with details shown in FIG. 4 and FIG. 5. Mounting attachment subassembly 11 details are shown in two versions, in FIG. 2 and FIG. 3.

Figure 2:
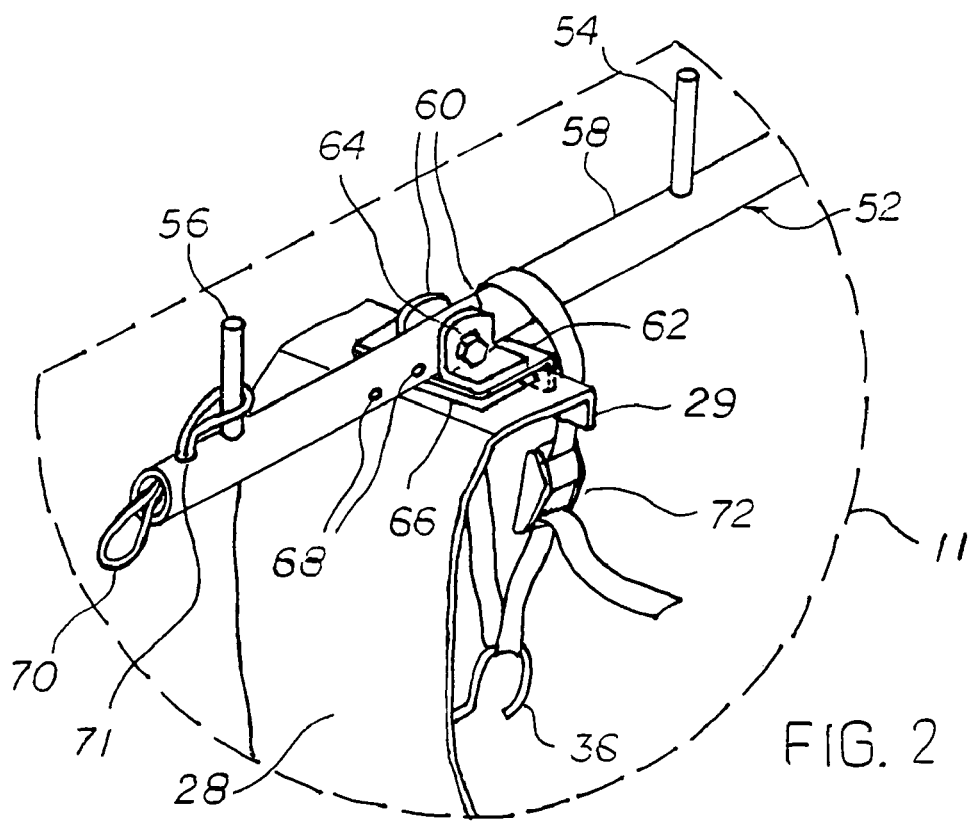
FIG. 2 is a pictorial view showing details of the mounting attachment of FIG. 1.

Referring now to FIG. 2, subassembly 11 shows the attachment of the left side rear mounting support assembly 52 with studs 54 and 56, and holes 68, to cargo box left sidewall 28. Rear support 58 is secured to brackets 60 which are integral with flanged base 62, via bolt 64, where brackets 60 rest on rubber sheet 66 placed on flange 29 of sidewall 28. Stud 56 and hole 71 anchor flexible loop 70, used for pole support. The attachment of rear support 58 is via buckle cord 72 to hook 36 in sidewall 28.

Referring now to FIG. 3, an alternate subassembly 11 is shown. All components are the same, except that the attachment of rear support 58 is via wing bolt 372 through base 362 and hole 363 to nut plate 365 secured to flange 29 (rather than via buckle cord 72).

Referring now to FIG. 4, details of closed tent pouch assembly 380 are shown. Orientation markings "Front" (386) and "Rear" (384) are placed on pouch 382 which houses folded tent 390 and is closed by zipper 388.

Figure 16:
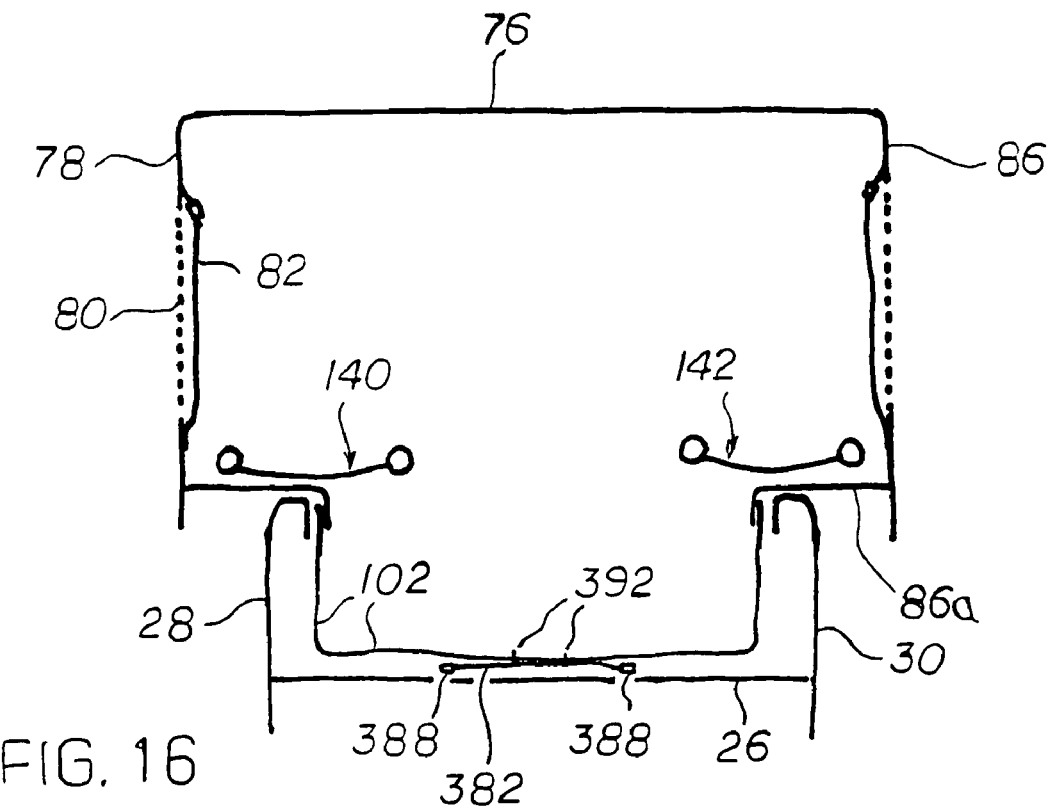
FIG. 16 is a cross-sectional rear view of a tent assembly installed in a truck.
Figure 17:
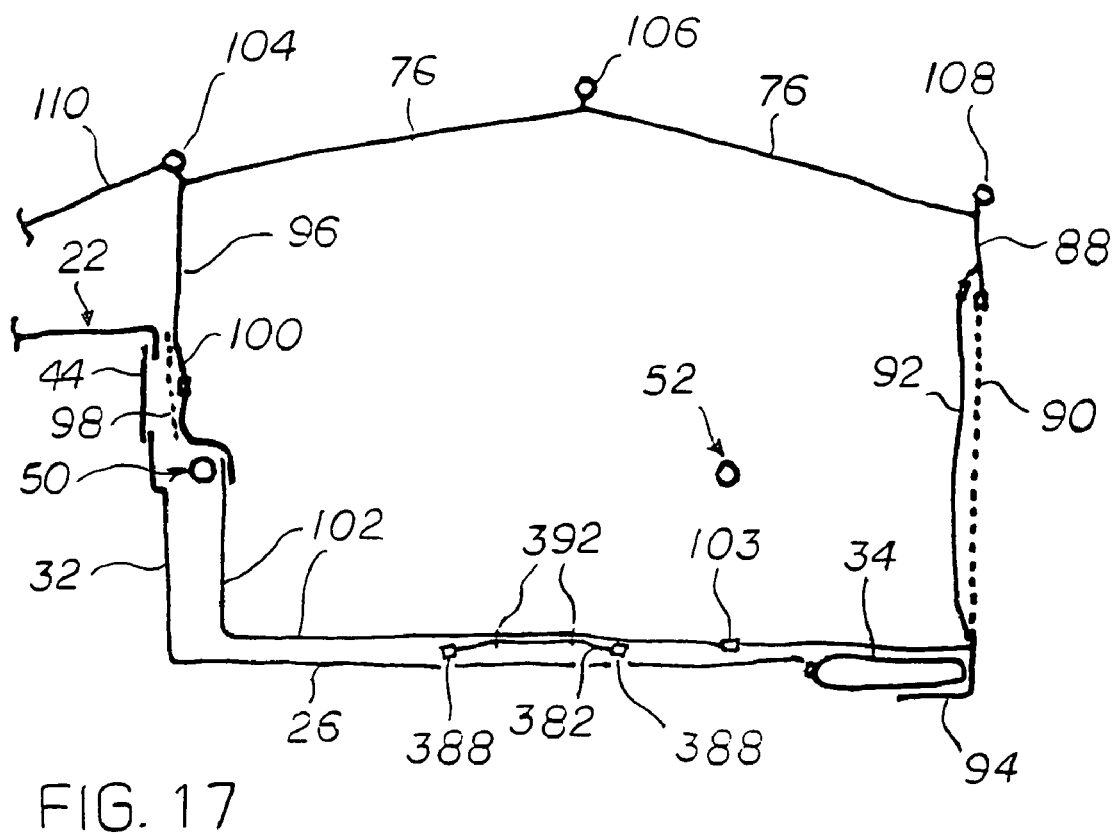
FIG. 17 is a cross-sectional side view of a tent assembly installed in a truck.

Referring now to FIG. 5, opened tent pouch assembly 380 with thread 392 is shown, with folded tent 390 removed from pouch 382. The other callouts are the same as in FIG. 4. The center portion of the tent floor is sewn to the pouch bottom as shown in FIG. 16 and FIG. 17.

Referring now to FIG. 6, a pictorial view of the Main Configuration tent assembly 74 mounted on a truck is shown.

First, the six faces of the tent:
Forward wall 96 with screen 98 and cab access panel 100;
Top face 76 of inverse U-shape (shown in FIG. 16);
Left wall 78 with screen 80, vent panel 82 and two holes 84;
Right wall 86
Aft wall 88 with screen door 90, door panel 92 and envelope 94, shaped to cover the tail gate of the truck; and
U-shaped floor 102 (details in FIG. 13).

The tent is kept erect by means of hooking straps and a pole structure. A front strap 110 is secured to the front of the truck, while aft straps (112 left and 114 right) are secured to the tailgate.

The pole structure contains lateral poles and side poles. Three lateral poles engage corresponding sleeves in the tent fabric:
Forward top pole 122 in forward sleeve 104
Center top pole 132 in center sleeve 106, and
Aft top pole 134 in aft sleeve 108.

The side poles are as follows
Two forward side poles 116 (left and right) connected at the top to forward top pole 122 and at the bottom to front support 59, indicated by numeral 12 (details in FIG. 7);
Two center side poles 126 (left and right) connected at the top to center top pole 132 and at the bottom to rear support 58, indicated by numeral 13 (details in FIG. 8);
Two aft side poles 128 (left and right) connected at the top to aft top pole 134 and at the bottom to rear support 58 (details in FIG. 8).

Figure 7:
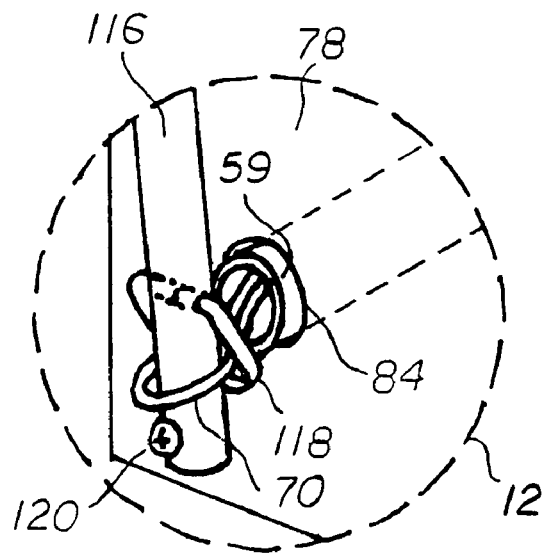
FIG. 7 is a pictorial view showing details of a front pole attachment to a front support.

Referring now to FIG. 7, details are shown of the bottom connection of a forward left side pole 116 to front support 59 by means of loop 70 (see FIG. 2) together with ring 118 and screw 120 through holes 84.

Figure 8:
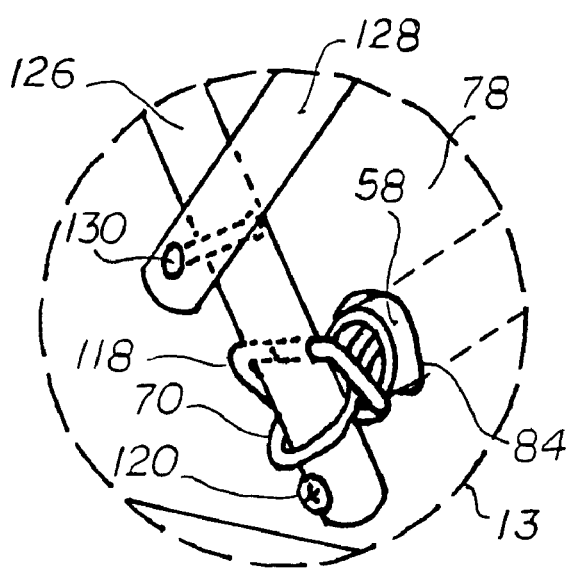
FIG. 8 is a pictorial view of a rear pole attachment to a rear support.

Referring now to FIG. 8, details are shown of the bottom connection of center left side pole 126 to left rear support 58, which is identical to the bottom connection of forward left side pole 116 to left front support 59, with identical callouts 70, 84, 118 and 120. In addition, left aft side pole 128 is secured to center left side pole 126 by means of pivotal rivet pin 130.

Referring now to FIG. 9, a pictorial view of an alternate version of the Main Configuration is shown in which cramping side pole 416, acting as a compressive member, replaces front hook strap 110 (FIG. 6) to perform the function of folding out the front of the tent structure.

The front and upper end of cramping side pole 416 is connected to the upper end of forward side pole 412 which at its lower end is connected to front support 59. These connections are denoted by numeral 15.

The rear and lower end of cramping side pole 416 is connected to rear mounting support 430, as shown in FIG. 11.

Tent structure and pole structure are otherwise identical to those in FIG. 6 and are not reproduced in FIG. 9 for the sake of clarity.

Referring now to FIG. 10, details of connections 15 are shown. The upper end of cramping pole 416 is attached by pivotal pin 414 to forward side pole 412 through suitable holes in both poles. The lower end of forward side pole 412 is attached to front support 59 by means of flexible cord loop 70 in combination with ring 118, screw 120 and holes 84.

Referring now to FIG. 11, details of connections 16 are shown. The compressed rear end flat 418 of cramping pole 416 holds pin 420 which is inserted into upward facing hole 432 in rear mounting support 430. Also, string 422, secured to cramping pole 416 by wide flat 418, ties cramping pole 416 to rear mounting support 430. Aft side pole 128 is attached to center side pole 126 by pivotal pin 130 through suitable holes in both poles. Center side pole 126 is attached to rear mounting support 430 by means of flexible cord loop 70 in combination with ring 118, screw 120 and holes 84.

Figure 12:
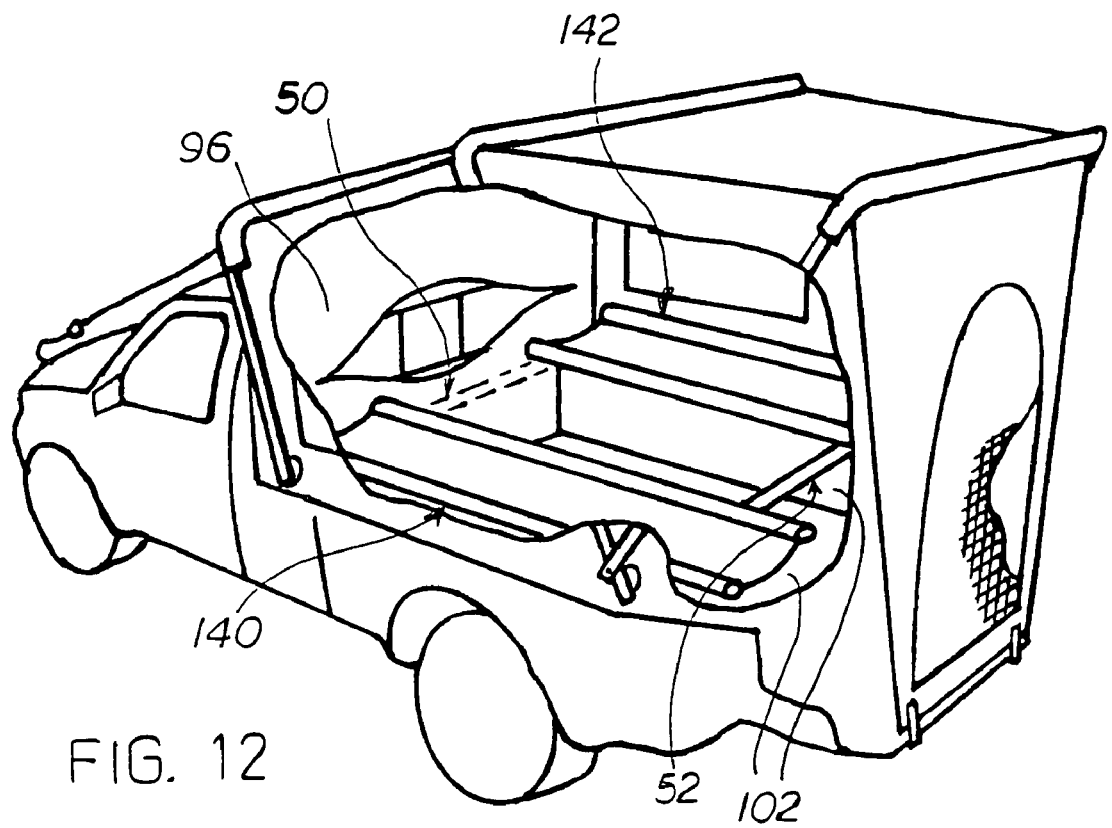
FIG. 12 is a pictorial view showing the interior of a tent.

Referring now to FIG. 12, a pictorial view of the interior of a tent is shown, as a breakaway of the exterior view of FIG. 6. Left bed 140 and right bed 142 abut forward wall 96 and are supported on front mounting support assembly 50 and rear mounting support assembly 52. Also shown is U-shaped floor 102.

Figure 13:
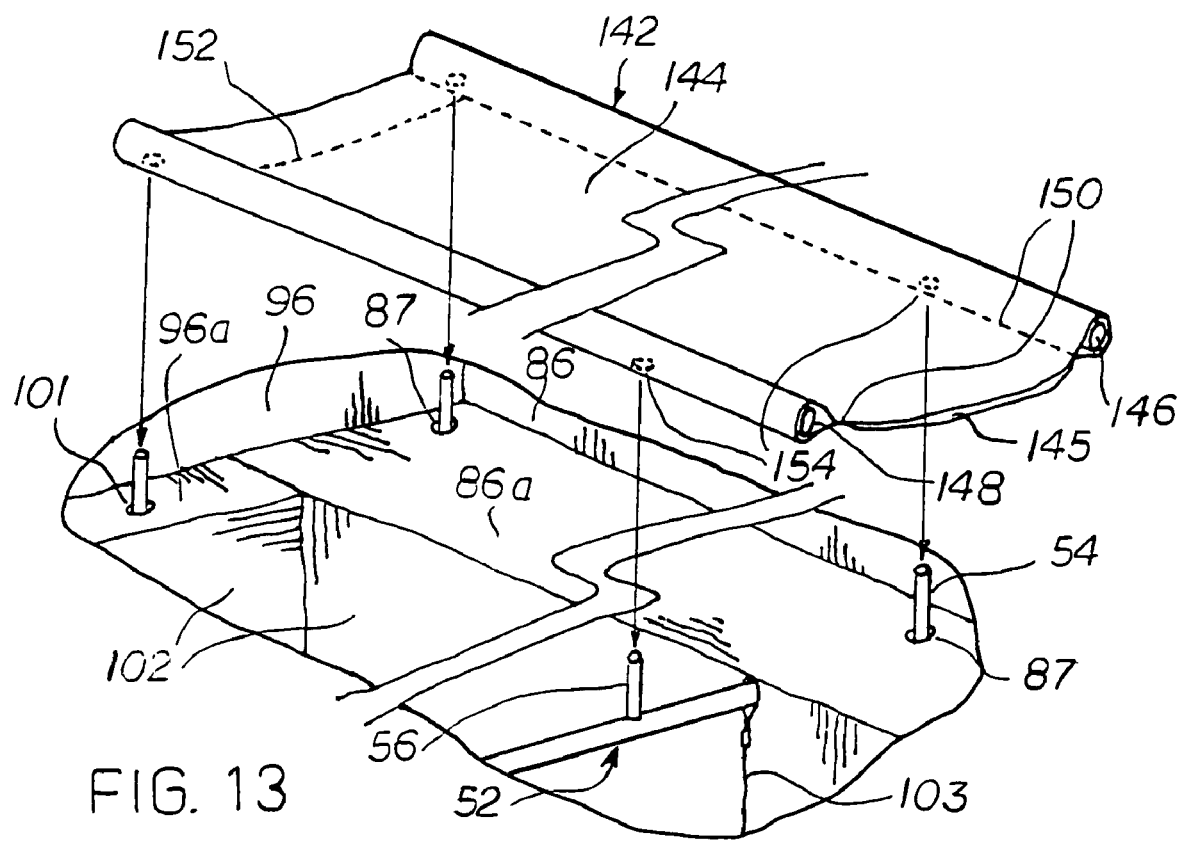
FIG. 13 is a pictorial view of a right side bed assembly, tent floor and side walls.

Referring now to FIG. 13, details of a bed 144 are shown. Two rigid longitudinal frames (146,148) are clad top and bottom, using threads 150 and 152, with flexible envelope 145 to accommodate the body shape of the sleeper. Each frame and each bed accommodate two holes 154 (4 holes total each per bed) which engage studs 54, 56 etc. anchored in front and rear mounting assemblies (50, 52) to firmly secure bed 144 to the truck. Being on the right side, bed 144 abuts forward wall 96 with flanged portion 96a and right tent sidewall 86 with inboard portion 86a. Also shown are components of floor 102, such as stud holes 87 and 101, and zipper 103.

Figure 14:
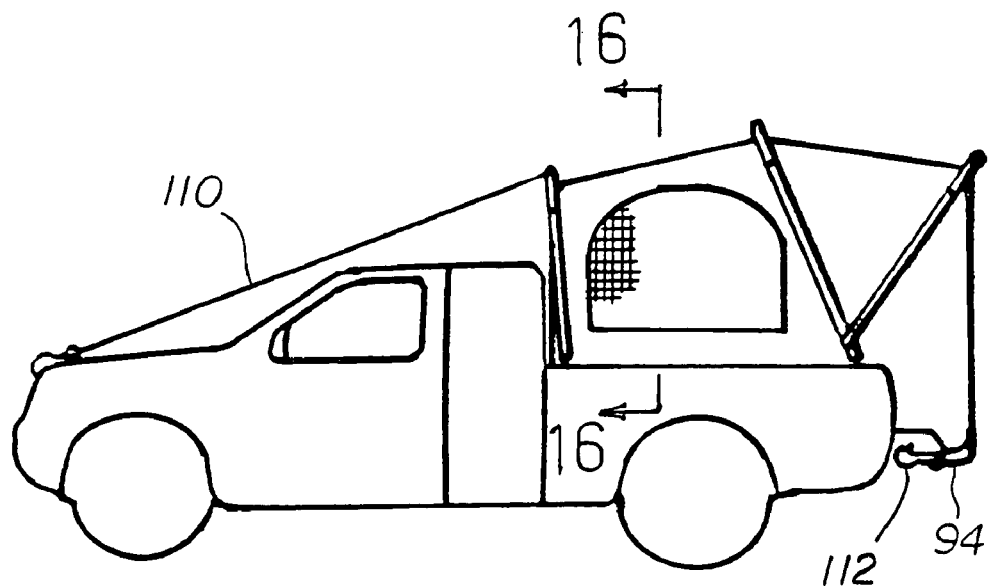
FIG. 14 is a side view of a tent assembly installed in a truck.

Referring now to FIG. 14, this is an external side view of a tent installed in a truck (Main Configuration as in FIG. 6). Shown are front hook strap 110 and aft (left) strap 112 secured over tailgate covered with envelope shaped, portion 94 of tent aft wall 88. Section 16-16 is shown in FIG. 16.

Figure 15:
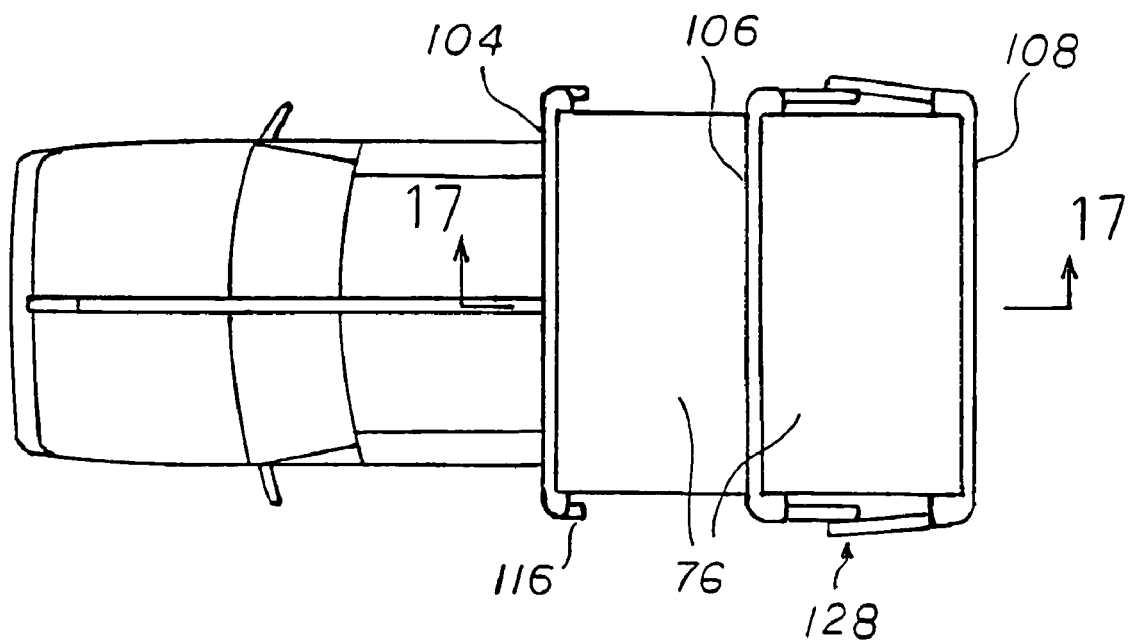
FIG. 15 is a top view of a tent assembly installed in a truck.

Referring now to FIG. 15, this is a top view corresponding to views in FIG. 6 and FIG. 14. Shown are forward sleeve 104, forward side pole 116, center sleeve 106, aft sleeve 108, aft side pole 128 and tent top face 76. Section 17-17 is shown in FIG. 17.

Referring now to FIG. 16, this is a cross-sectional rear view along Section 16-16 in FIG. 14. The tent surfaces are shown: top face 76, left wall 78, right wall 86, screen 80, vent panel 82. Then the left bed assembly 140 and right bed assembly 142. The tent is completed with tent floor 102 and anchored to left sidewall 28 and right sidewall 30. Cargo box floor 26 supports tent pouch 382 with tent and pouch sewn threads 392 and zippers 388.

Referring now to FIG. 17, this is a cross-sectional side view along Section 17-17 in FIG. 15. Shown are the tent components: top face 76, center sleeve 106, forward sleeve 104, aft sleeve, 108, front hook strap 110, aft wall 88, forward wall 96, tent floor 102 and floor zipper 103 which allows temporary access to support 58. Other components are cab access panel 100, aft screen door 90, door panel 92, screen 98, front mounting support assembly 50 and rear mounting support assembly 52. Truck components are cab rear window 44, cargo box forward wall 32, cargo box tailgate 34, and cargo box floor 26 on which rest tent pouch 382 with tent and pouch sewn threads 392 and zippers 388. Also shown is the aft wall envelope shaped portion 94 covering tailgate 34.

Figure 18:
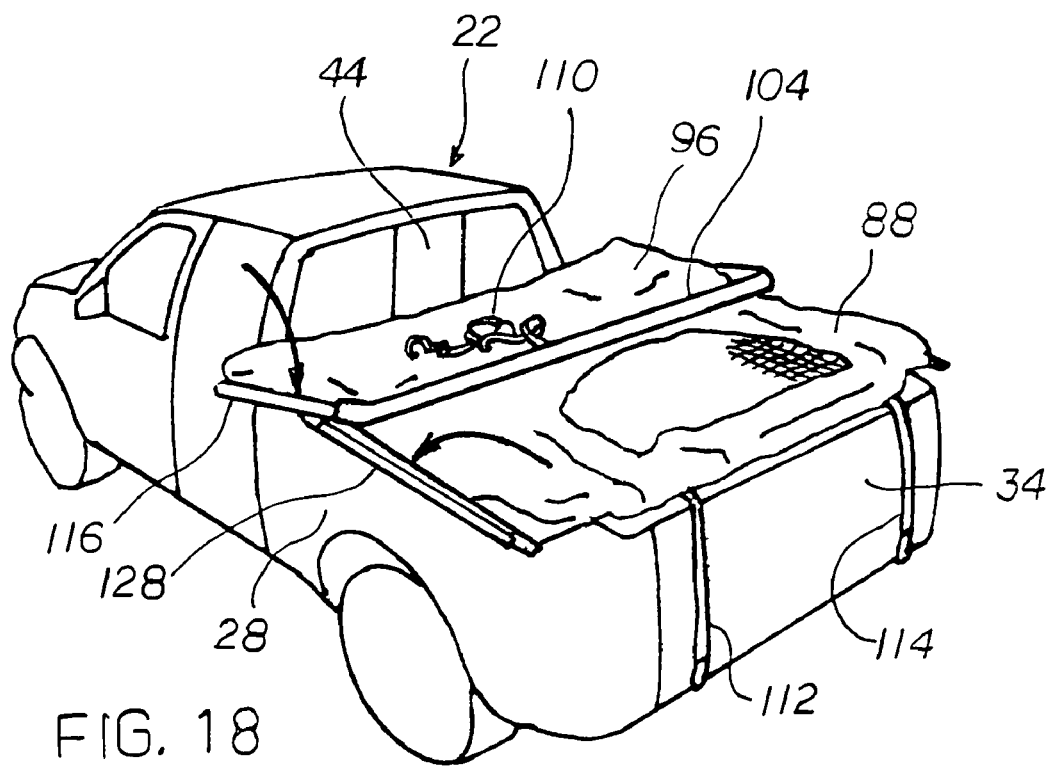
FIG. 18 is a pictorial view of a collapsed tent assembly installed in a truck.

Referring now to FIG. 18, this is a pictorial view of a collapsed tent assembly installed in a truck. It is seen that the driver has a free view through rear window 44 of cab 22, with all tent components collapsed below window 44. In the collapsed state, the topmost tent layer is tent forward wall 96 with forward sleeve 104, rearward rotated forward pole 116 and exposed loose front strap 110. Immediately adjacent and also laid flat is aft tent wall 88 with rearward facing aft side pole 128, with aft straps 112 and 114 in place attached to tail gate 34.

Figure 19:
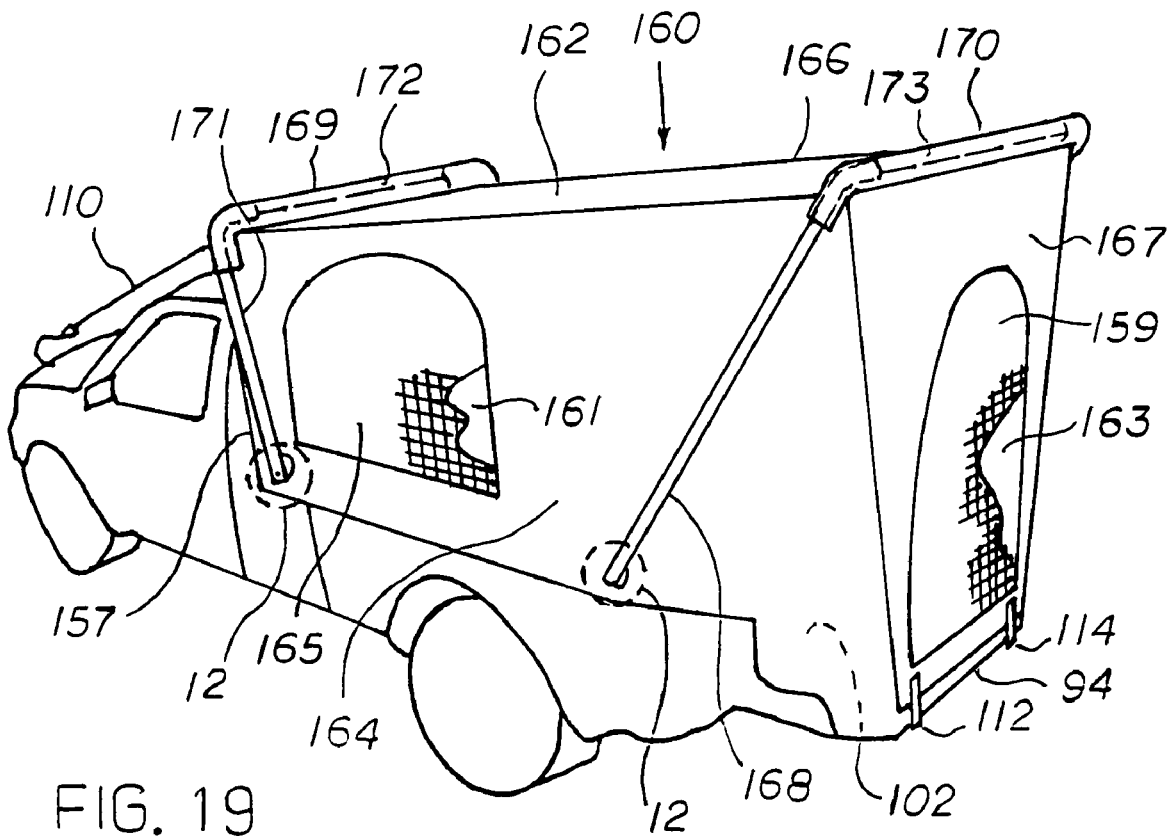
FIG. 19 is a pictorial view of Alternative No. 1 tent assembly mounted on a truck, (compare with FIG. 6)

Referring now to FIG. 19 this is a pictorial view of Alternative No. 1 tent assembly mounted on a truck. Compared to the Main Configuration in similar view of FIG. 6, the number of poles has been reduced. Tent assembly 160 now has these six surfaces:

Top face 162 of inverse U-shape;
Forward wall 157;
Left wall 164 with screen 165 and vent panel 161;
Right wall 166;
Aft wall 167 with aft screen door 159, door panel 163 and (as before) envelope shaped aft wall portion 94 to cover the tailgate; and
Tent floor 102.

As before, front strap 110 and rear straps 112 and 114 fulfil the same functions of erecting the tent. Side poles are now: Forward side poles 171, left and right, at their top attached via forward sleeve 169 to forward top pole 172, and Aft side poles 168, left and right, at their top attached via aft sleeve 170 to aft top pole 173.

Both the forward and aft side poles are attached at their lower ends to, respectively, front and rear supports by the structure shown in FIG. 7 and indicated on FIG. 19 by numeral 12 in both places.

Figure 20:
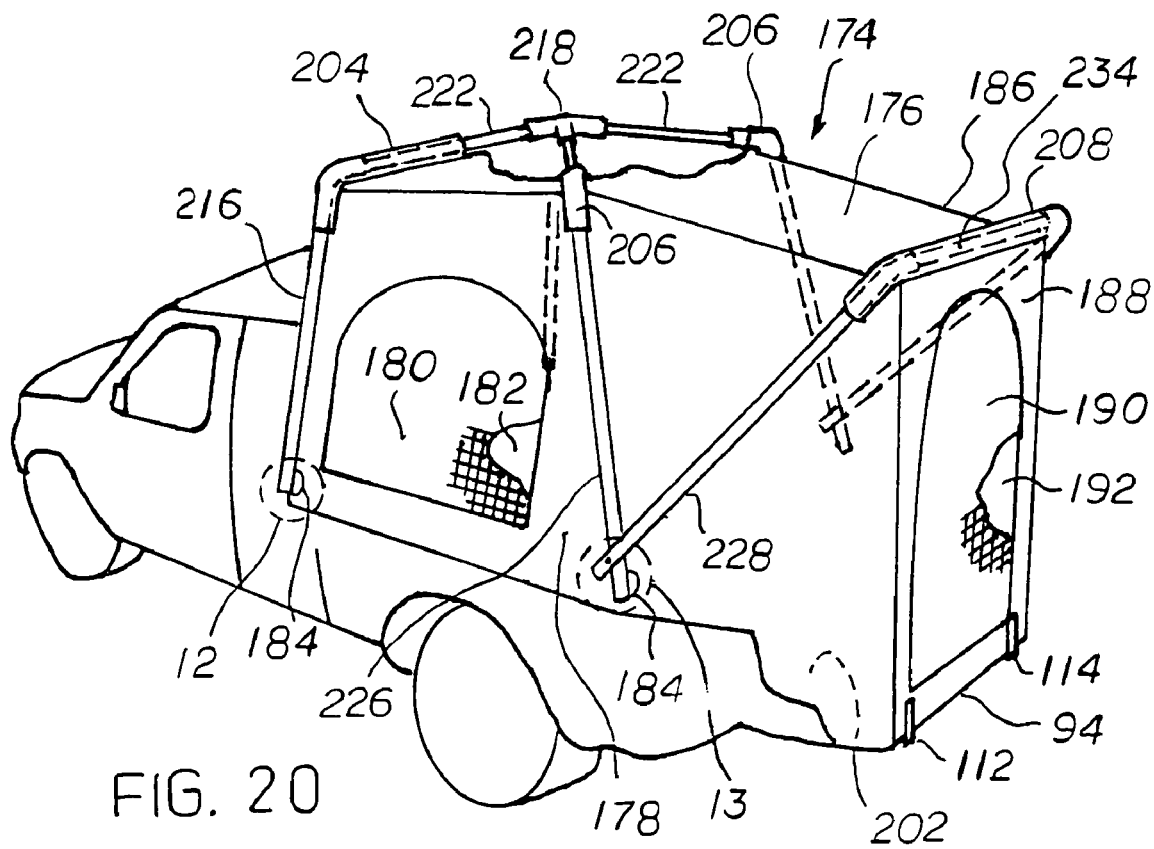
FIG. 20 is a pictorial view of Alternative No. 2 tent assembly mounted on a truck (compare with FIG. 6)

Referring now to FIG. 20, this is a pictorial view of Alternative No. 2 tent assembly mounted on a truck. Compared to the Main Configuration of FIG. 6, additional roof poles are used. Tent assembly 174 now has these six surfaces:

Top face 176 of inverse U-shape;
Forward wall 196 (see FIG. 22)
Left wall 178 with screen 180, vent panel 182 and holes 184;
Right wall 186;
Aft wall 188 with aft screen 190, door panel 192 and (as before) envelope-shaped aft wall portion 94 to cover the tailgate; and
Tent floor 202.

Aft straps 112 (left) and 114 (right) are in place. The side poles are now:

1. Forward side poles (left and right) 216, at their top ends connected via forward sleeves 204 to short forward top poles 222 which terminate in X-shaped central joint 218. At their bottom ends poles 216 are connected to front support 59 by the structure shown in FIG. 7 and indicated by the numeral 12 on FIG. 20.

2. Two center side poles 226 and two aft side poles 228. Center side poles 226 at their top ends connect via center sleeves 206 to short forward top poles 222 which terminate in X-shaped central joint 218.

Aft side poles 228 at their top end connect via aft sleeves 208 to aft top pole 234. At their bottoms aft side poles 228 attach to the bottom of center side poles 226 which connect to rear support 58 by the structure shown in FIG. 8 which is indicated by numeral 13 on FIG. 20. Unlike the Main Configuration (FIG. 6) and Alternative No. 1 (FIG. 19) both of which are collapsible, Alternative No. 2 (FIG. 20) is not collapsible.

Figure 21:
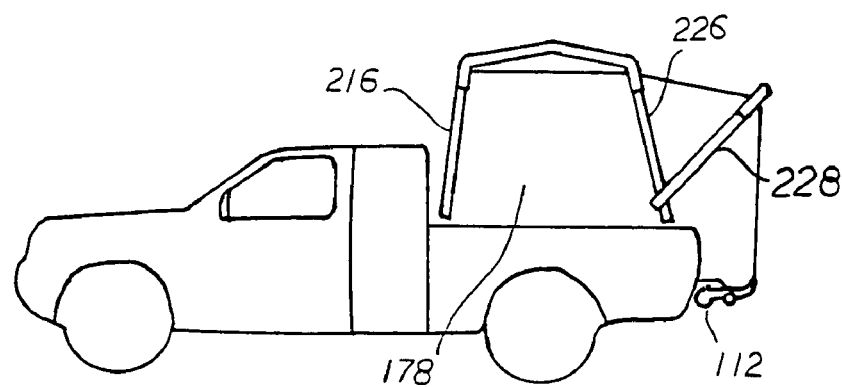
FIG. 21 is a side view of Alternative No. 2 tent assembly mounted on a truck (as in FIG. 20)

Referring now to FIG. 21, this is an external left side view of Alternative No. 2 Tent Assembly mounted on a truck as in pictorial view of FIG. 20. All side poles are visible, forward 216, center 226 and aft 228, as well as left wall 178 and aft left strap 112.

Figure 22:
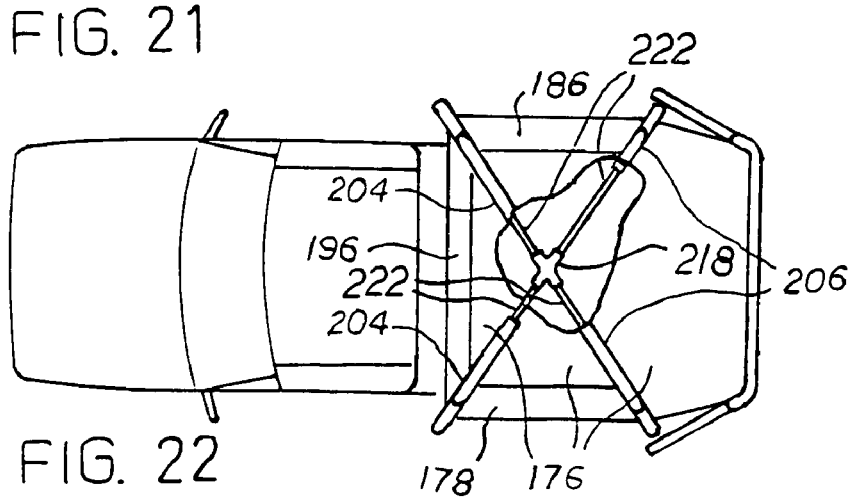
FIG. 22 is a top view of Alternative No. 2 tent assembly mounted on a truck (as in FIG. 20)

Referring now to FIG. 22, this is a top view of Alternative No. 2 Tent Assembly mounted on a truck as in pictorial view of FIG. 20. Visible is the X-shaped configuration on the roof of the tent, formed by forward sleeves 204 and center sleeves 206, all of them attached to short forward top poles 222 leading to central X-shaped joint 218. Also shown are the tent top face 176, right wall 186, left wall 178, and forward wall 196.

Figure 23:
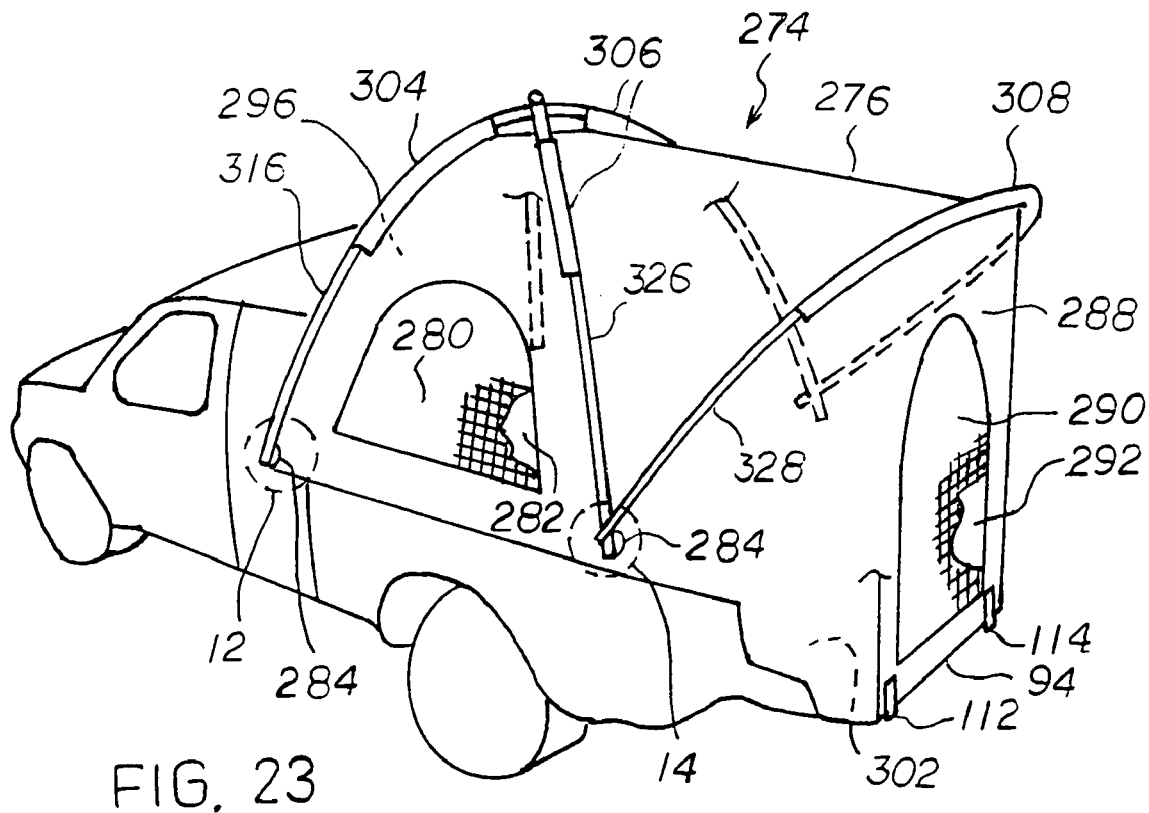
FIG. 23 is a pictorial view of Alternative No. 3 tent assembly mounted on a truck (compare with FIG. 6)

Referring now to FIG. 23, this is a pictorial view of Alternative No. 3 tent assembly 274 mounted on a truck. Compared to Alternative No. 2 as shown in FIG. 20, straight rigid forward, center and aft poles have been replaced by one-piece flexible poles 316, 326 and 328, all formed into curved parabolic shapes. Due to the crossing of poles 316 and 326 at top center, pole 316 is forward on the right but center on the left, and pole 326 is center on the right, but forward on the left. Like Alternative No. 2, Alternative No. 3 is not collapsible.

Pole 316 over its curved portion engages forward sleeves 304; pole 326 over its curved portion engages center sleeves 306; and aft pole 328 over its curved portion engages one-piece aft sleeve 308.

The four tent faces are:
forward wall 296;
aft wall 288 with aft screen 290, door panel 292 and envelope shaped portion 94;
U-shaped floor 302 and
inverse U-shape top surface 276 with screens 280, vent panels 282, and four holes 284 which engage front and rear supports 59 and 58 at their connection with the bottom extremities of poles 316 and 326. The details of connection of pole 316 with front support 59 are shown in FIG. 7 and indicated by numeral 12 on FIG. 23.

When left and right hook straps 112 and 114 are secured to the truck tailgate, the tent structure is erected by stretching the contiguous top surface 276 and aft wall 288 over parabolic aft pole 328.

Figure 24:
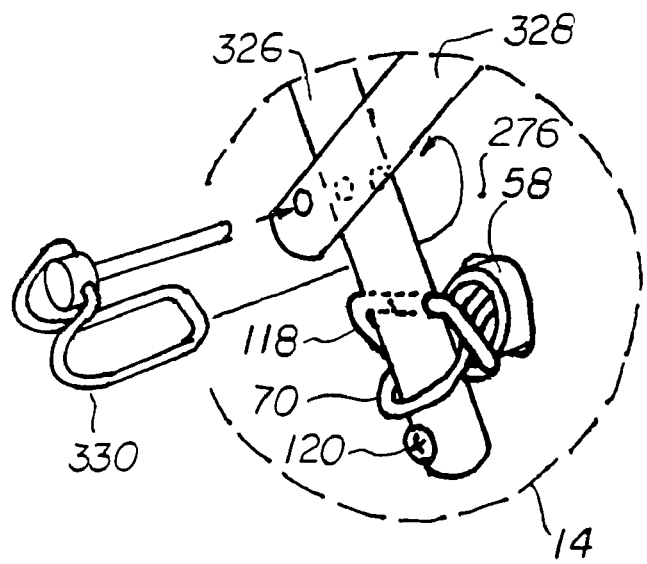
FIG. 24 is a pictorial view of Alternative No. 3 tent assembly, showing details of detachable attachment of rear pole to center pole.

Referring now to FIG. 24, details are shown of the connection of aft pole 328 to pole 326 by means of snap pin 330 which links suitable holes in poles 326 and 328. A mechanism of rings 70 and 118 and screw 120 attaches the bottoms of pole 326 to extremities of rear support 58, as detailed in FIG. 8 and indicated by numeral 14 on FIG. 23.

Advantages

The Camper Truck Tent of this invention offers many advantages for use in the outdoors where ease, efficiency and speed of tent deployment and removal are important. Advantages include:

No tools required for tent installation in and removal from a truck;

Ease of attaching and detaching all tent components from a truck;

Tent storage, availability and deployment is foolproof, with tent sewn to storage pouch, and folded and protected in storage pouch in proper orientation for installation in truck;

Mounting support assemblies utilize existing truck cargo hooks or flanges, avoiding need for external equipment;

Tent side poles are attached and detached by a loop-and-ring system which is easily manipulated by unskilled labor without tools;

Tent floor contains a zipper for temporary access to mounting support assemblies;

Tent collapses easily though the pole attachment is outside the truck cargo box;

Mounting support assemblies are located on top of cargo box sidewalls and so make the entire cargo box volume available for camping items and personal belongings;

Mounting support assemblies accommodate different cargo box dimensions and can extend laterally beyond cargo box sidewalls for increased tent volume and tent user comfort;

Raised flexible canvas beds attached to mounting support assemblies provide increased sleeping comfort compared to sleeping on hard cargo box floor; and Beds are provided with fabric envelopes which serve to store poles and mounting support assemblies when placed in storage.

Comparison of Camper Truck Tent Configurations

This invention provides the Advantages listed above in the configurations which have been described in the Detailed Description. A short comparison of configurations follows:

Main Configuration Collapsible
a. with front hook strap (FIG. 6)
b. with cramping side pole instead of front hook strap (FIG. 9)
Alternative No. 1 (FIG. 19): Collapsible
With front hook strap—fewer components—no center side and top poles.
Alternative No. 2 (FIG. 20): Not collapsible
No front hook strap, but more poles.
Alternative No. 3 (FIG. 23): Not collapsible
No front hook strap—decreased tent volume.

Operation

As shown in the preceding Comparison, the Main Configuration and Alternative No. 1 are of the collapsible type, whereas Alternative No. 2 and Alternative No. 3 are of the non-collapsible type. However, certain operational procedures are common to both types.

Both types are stored identically, in three items:
a. the tent in a tent pouch (FIG. 4, FIG. 5)
b. all poles in one bed envelope, and
c. the front and rear mounting support assemblies (FIG. 1) in the other bed envelope.

The installation in the truck may be divided into an initial and a final installation. The initial installation is the same for both types:

The front and rear mounting support assemblies are removed from their envelope and securely mounted on the truck cargo box side walls (FIG. 2, FIG. 3). The tent pouch, marked "Front" and "Rear" is properly placed on the truck cargo box floor, the pouch zipper (FIG. 4, FIG. 5) is opened and the tent is spread out in proper orientation, after which the ten hales in the tent are fitted to the ten studs in the front and rear mounting support assemblies and support ends.

The subsequent final installation is different for all configurations and described in the following four listings:

Final Installation for Main Configuration:

1. Insert three top poles into the sleeves of the tent;

2. Attach the angled ends of four side poles, two left and two right, to the center and aft top poles. Then attach the other ends of the two center side poles to the loops of the rear mounting support assembly (FIG. 8). The left and right side poles, center top and aft top poles and rear mounting support assembly form two horizontal rectangles on the truck cargo box 3. Attach the angled ends of the left and right forward side poles to the forward top pole. Then attach the other ends of the forward side poles to the front mounting support assembly to form a horizontal rectangle placed over the two rectangles formed with the rear mounting support assembly.

4a. For Configuration (a)(FIG. 6): Attach the front strap to the front of the vehicle to lift the forward top pole;

4b. For Configuration (b)(FIG. 9, 10, 11): Rotate forward side pole counterclockwise and lift forward top pole. Insert pin 420 of cramping side pole 416 into hole 432 of rear mounting support 430. Tie string 422 to rear mounting support 430 to prevent pin 420 from sliding out and to pole 416 until tailgate is tilted down to give compression to pole 416.

5. Attach the aft straps to the tail gate, then tilt down the tailgate to lift the center top and aft top poles (FIG. 6);

6. Close the tent floor zipper;

7. Install left and right beds on the studs of the mounting support assemblies.

Final Installation for Alternative No. 1 (FIG. 19)

1. Insert the two top poles into the sleeves of the tent;

2. Attach the angled ends of right and left aft side poles to the aft top pole. Then attach the other ends of the side poles to the loops of the rear support as shown in FIG. 7. The left and right side poles and rear mounting assembly form a horizontal rectangle on the truck cargo box.

3. 4a. 5. 6. 7. of the Main Configuration above.

Final Installation for Alternative No. 2 (FIG. 20)

1. Insert four forward top poles into tent sleeves and attach to the bare X-shaped joint;

2. Insert aft top pole into aft sleeve;

3. Attach left and right forward side poles to two forward top poles. Attach left and right center side poles to the two top poles. Then attach left and right aft side poles to the aft top pole.

4. Lift the side poles and attach lower ends of side poles to loops of mounting support assemblies at four locations;

5. Attach aft straps to tailgate, then tilt down tailgate to stretch the top and aft tent walls;

6. Close the tent floor zipper;

7. Install left and right beds on studs of mounting support assemblies.

Final Installation of Alternative No. 3 (FIG. 23)

1. Insert the three poles into the tent sleeves;

2. Attach two forward poles to loops of front and rear mounting support assemblies at four locations;

3-Attach aft poles to forward poles with snap pins 330 at two locations;

4. Attach aft straps to tailgate; then tilt down tailgate to stretch top and aft tent walls;

5. Close the tent floor zipper;

6. Install left and right beds on studs of mounting support assemblies.

Collapsing Main and Alternative No. 1 Configurations

As shown in FIG. 18, the tent can assume a flat collapsed state in the truck cargo box, giving the driver rear window visibility to drive, if desired, to another camp site and speedily re-deploy the tent.

This is achieved with FIG. 6 and FIG. 19 by lifting the tailgate to vertical and unhooking the front strap from the truck: these actions cause the aft pole and tent aft portion to fall forward on the cargo box; and the forward top pole and tent forward portion to fall rearward on top of the collapsed aft poles and tent.

For FIG. 9, the pin securing the cramping side pole to the mounting support is removed, causing the forward top pole and tent forward portion to fall rearward.

With both the front strap and cramping pole arrangements, a reversal of the collapsing actions will easily set up the tent again.

Removal of Tent Equipment—all Configurations

1. Dismantle all pole structures and collect poles;

2. Ready the two bed envelopes;

3. Fold up tent assembly and pack into pouch attached underneath tent floor, properly oriented along "Front" and "Rear" markings, and close pouch zipper.

4. Remove front and rear mounting support assemblies;

5. Store mounting support assemblies in one envelope, and all poles in the other bed envelope.

The Camper Truck Tent is now again stored in the three items described at the beginning of the Operation section.

It is to be understood that the invention may be realized with embodiments differing from the specific devices and procedures disclosed herein without departing from the scope of the present invention as delineated in the following claims.

I claim:

1. A camper truck tent detachably mounted on an open truck having a cab with a rear window, a cargo box with a floor, a forward wall, a left vertical sidewall, a right vertical sidewall, and a tailgate, the camper truck tent comprising:
a front mounting support assembly detachably mounted across the tops of the left and right vertical sidewalls, wherein the front mounting support assembly is formed as a tube extending straight from the top of the left vertical sidewall to the top of the right vertical sidewall;
a rear mounting support assembly detachably mounted across the tops of the left and right vertical sidewalls aft of and parallel to the front mounting support assembly, wherein the rear mounting support assembly is formed as a tube extending straight from the top of the left vertical sidewall to the top of the right vertical sidewall;
a tent pole assembly detachably secured to the front and rear mounting support assemblies, wherein the tent pole assembly is pivotally secured at an angle to a right end and a left end of the front mounting support assembly, wherein the tent pole assembly is pivotally secured at an angle to a right end and a left end of the rear mounting support assembly; a tent assembly detachably secured to the tent pole assembly;
an erecting means for folding out the tent assembly; and
a number of beds placed inside the erected tent assembly and removably attached to the front and rear mounting support assemblies;
whereby the camper truck tent is removably mounted on the truck, erected and furnished, all in an effortless manner.

2. The camper truck tent of claim 1, wherein the tent pole assembly comprises
a forward side pole pivotally attached to the front mounting support assembly;
a center side pole pivotally attached to the rear mounting support assembly; and
an aft side pole pivotally attached to the rear mounting support assembly.

3. The camper truck tent of claim 1 wherein the number of beds is two, each bed comprising two frames and a cladding.

4. The camper truck tent of claim 3 wherein the cladding of the first bed is an envelope for storing the tent pole assembly, and the cladding of the second bed is an envelope for storing the front and rear mounting support assemblies.

5. The camper truck tent of claim 1, wherein the tent assembly in the folded out state comprises six faces:
a forward wall;
a top face of inverse-U shape;

a left wall having a screen and a vent panel;
a right wall having a screen and a vent panel;
an aft wall having a screen door and a door panel; and
a U-shaped floor.

6. A camper truck tent detachably mounted on an open truck having a cab with a rear window, a cargo box with a floor, a forward wall, a left vertical sidewall, a right vertical sidewall, and a tailgate, the camper truck tent comprising:
   a front mounting support assembly detachably mounted across the tops of the left and right vertical sidewalls;
   a rear mounting support assembly detachably mounted across the tops of the left and right vertical sidewalls aft of and parallel to the front mounting support assembly;
   a tent pole assembly detachably secured to the front and rear mounting support assemblies; a tent assembly detachably secured to the tent pole assembly;
   an erecting means for folding out the tent assembly; and
   a number of beds placed inside the erected tent assembly and removably attached to the front and rear mounting support assemblies;
   wherein the tent assembly in the folded out state comprises six faces:
      a forward wall; a top face of inverse-U shape; a left wall having a screen and a vent panel; a right wall having a screen and a vent panel; an aft wall having a screen door and a door panel; and a U-shaped floor; wherein
   the tent assembly further comprises a forward lateral sleeve, a center lateral sleeve, and an aft lateral sleeve;
   the tent pole assembly comprises: a forward top lateral pole, a center top lateral pole, an aft top lateral pole, left and right forward side poles, left and right center side poles, and left and right aft side poles;
   wherein, in a deployed position,
   the forward top lateral pole is engaged in the forward lateral sleeve,
   the center top lateral pole is engaged in the center lateral sleeve,
   the aft top lateral pole is engaged in the aft lateral sleeve,
   the left and right forward side poles from the forward top lateral pole are connected to the front mounting support assembly,
   the left and right center side poles from the center top lateral pole are connected to the rear mounting support assembly,
   and the left and right aft side poles from the aft top lateral pole are connected to the rear mounting support assembly.

7. The camper truck tent of claim 6, wherein the erecting means is a front strap secured to the front of the truck, plus aft straps secured to the tailgate.

8. The camper truck tent of claim 6, wherein the erecting means is a cramping side pole connected from an upper extremity of the forward side pole to the rear mounting support assembly, plus aft straps secured to the tailgate.

9. A camper truck tent detachably mounted on an open truck having a cab with a rear window, a cargo box with a floor, a forward wall, a left vertical sidewall, a right vertical sidewall, and a tailgate, the camper truck tent comprising:
   a front mounting support assembly detachably mounted across the tops of the left and right vertical sidewalls;
   a rear mounting support assembly detachably mounted across the tops of the left and right vertical sidewalls aft of and parallel to the front mounting support assembly;
   a tent pole assembly detachably secured to the front and rear mounting support assemblies; a tent assembly detachably secured to the tent pole assembly;
   an erecting means for folding out the tent assembly; and
   a number of beds placed inside the erected tent assembly and removably attached to the front and rear mounting support assemblies;
   wherein the tent assembly in the folded out state comprises six faces:
   a forward wall; a top face of inverse-U shape; a left wall having a screen and a vent panel; a right wall having a screen and a vent panel; an aft wall having a screen door and a door panel; and a U-shaped floor; wherein
   the tent assembly further comprises a forward lateral sleeve, a center lateral sleeve and an aft lateral sleeve;
   the tent pole assembly comprises six poles: left and right forward side poles, a forward top lateral pole, left and right aft side poles, and an aft top lateral pole;
   wherein, in a deployed position,
   the forward top lateral pole is engaged with the forward sleeve,
   the aft top lateral pole is engaged with the aft sleeve,
   the left and right forward side poles from the forward top lateral pole is connected to the front mounting support assembly, and
   the left and right aft side poles from the aft top lateral pole is connected to the rear mounting support assembly; and
   the erecting means is a front strap.

10. A camper truck tent detachably mounted on an open truck having a cab with a rear window, a cargo box with a floor, a forward wall, a left vertical sidewall, a right vertical sidewall, and a tailgate, the camper truck tent comprising:
    a front mounting support assembly detachably mounted across the tops of the left and right vertical sidewalls;
    a rear mounting support assembly detachably mounted across the tops of the left and right vertical sidewalls aft of and parallel to the front mounting support assembly;
    a tent pole assembly detachably secured to the front and rear mounting support assemblies; a tent assembly detachably secured to the tent pole assembly;
    an erecting means for folding out the tent assembly; and
    a number of beds placed inside the erected tent assembly and removably attached to the front and rear mounting support assemblies;
    the tent pole assembly comprises left and right forward side poles, four short forward top poles, an X-shaped joint, left and right center side poles, two aft side poles, and an aft top pole;
    wherein, in a deployed position
    an X-shaped roof is formed by inserting the four short forward top poles into the X-shaped joint,
    the left and right forward side poles from the forward extremities of the X-shaped roof are connected to the front mounting support assembly,
    the left and right center side poles from the aft extremities of the X-shaped roof are connected to the rear mounting support assembly, and
    the left and right aft side poles from the aft top pole are connected to the rear mounting support assembly; and
    wherein the erecting means is the rigidity of the X-shaped roof and attached pole structure, plus the aft straps.

11. A camper truck tent detachably mounted on an open truck having a cab with a rear window, a cargo box with a floor, a forward wall, a left vertical sidewall, a right vertical sidewall, and a tailgate, the camper truck tent comprising:
    a front mounting support assembly detachably mounted across the tops of the left and right vertical sidewalls;
    a rear mounting support assembly detachably mounted across the tops of the left and right vertical sidewalls aft of and parallel to the front mounting support assembly;

a tent pole assembly detachably secured to the front and rear mounting support assemblies; a tent assembly detachably secured to the tent pole assembly;

an erecting means for folding out the tent assembly; and a number of beds placed inside the erected tent assembly and removably attached to the front and rear mounting support assemblies;

the tent pole assembly comprises parabola-shaped forward, center and aft poles;

the tent assembly comprises four faces: a forward wall, an aft wall with an aft screen and a door panel, a U-shaped floor and a top surface of inverse U-shape with screens, vent panels and four hollow connectors;

wherein, in a deployed position the four hollow connectors are connected to the front and rear mounting support assemblies, the forward parabolic pole from the left side of the front mounting support assembly is connected to the right side of the rear mounting support assembly, the center parabolic pole from the left side of the rear mounting support assembly is connected to the right side of the front mounting support assembly, and the aft parabolic pole from the left side of the rear mounting support assembly is connected to the right side of the rear mounting support assembly; and wherein the erecting means is a stretching the tent top surface and the tent aft wall over the parabolic aft pole, in addition to securing the aft straps.

12. The camper truck tent of claim 1, wherein the rear mounting support assembly comprises a plurality of rear mounting support assembly studs protruding upwardly from the rear mounting support assembly, wherein the front mounting support assembly comprises a plurality of front mounting support assembly studs protruding upwardly from the rear mounting support assembly.

13. The camper truck tent of claim 12, wherein the tent pole assembly comprises a forward side pole pivotally attached to the front mounting support assembly;

a center side pole pivotally attached to the rear mounting support assembly; and an aft side pole pivotally attached to the rear mounting support assembly.

14. The camper truck tent of claim 12, wherein the number of beds is two, each bed comprising two frames and a cladding.

15. The camper truck tent of claim 12, wherein the cladding of the first bed is an envelope for storing the tent pole assembly, and the cladding of the second bed is an envelope for storing the front and rear mounting support assemblies.

* * * * *